Aug. 18, 1925.

H. D. HUKILL 1,549,772

AUTOMOTIVE BRAKE EQUIPMENT

Filed Jan. 10, 1925

INVENTOR
HENRY D. HUKILL
BY Wm. M. Cady
ATTORNEY

Patented Aug. 18, 1925.

1,549,772

UNITED STATES PATENT OFFICE.

HENRY D. HUKILL, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

AUTOMOTIVE BRAKE EQUIPMENT.

Application filed January 10, 1925. Serial No. 1,618.

*To all whom it may concern:*

Be it known that I, HENRY D. HUKILL, a citizen of the United States, residing at Pittsburgh, in the county of Allegheny and State of Pennsylvania, have invented new and useful Improvements in Automotive Brake Equipments, of which the following is a specification.

This invention relates to brakes, and more particularly to a brake equipment for a motor vehicle.

The principal object of my invention is to provide an improved motor vehicle brake equipment in which the motor accelerator and the brakes in service are controlled by the operation of a single foot pedal and in which an emergency brake application is effected when the operator removes his foot from the control pedal.

Figure 1:
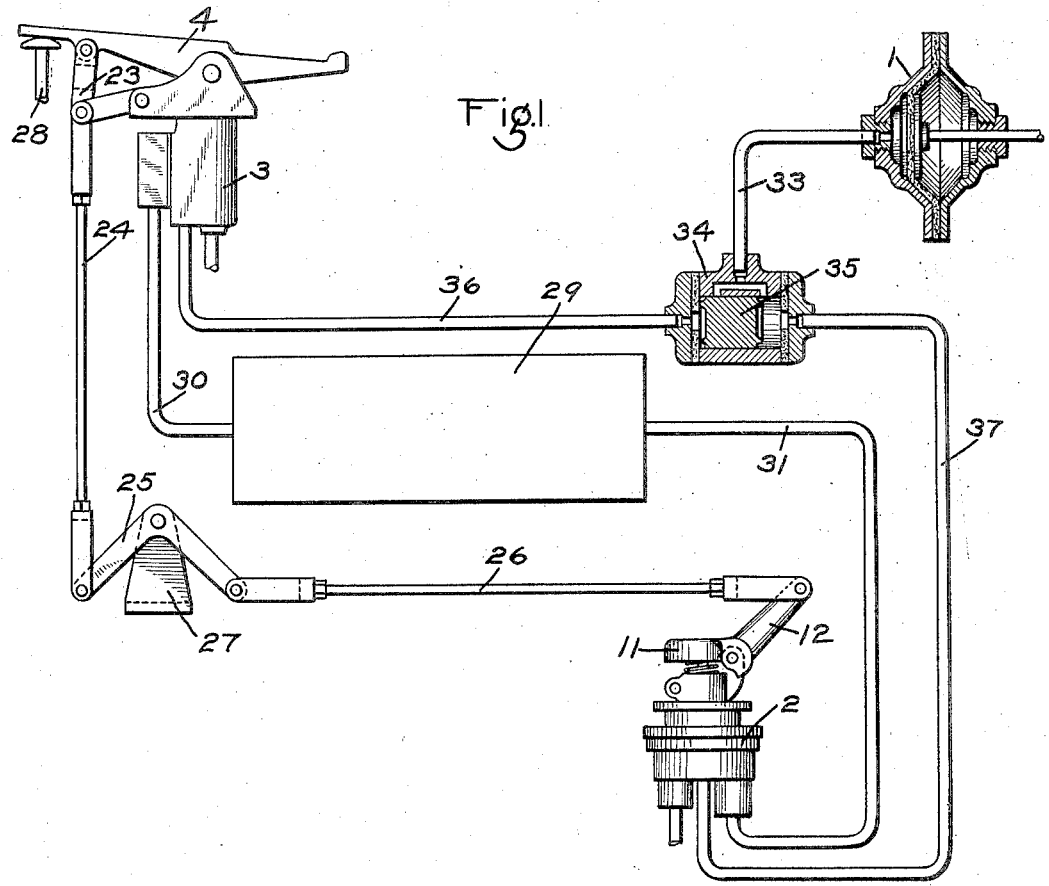
Figure 2:
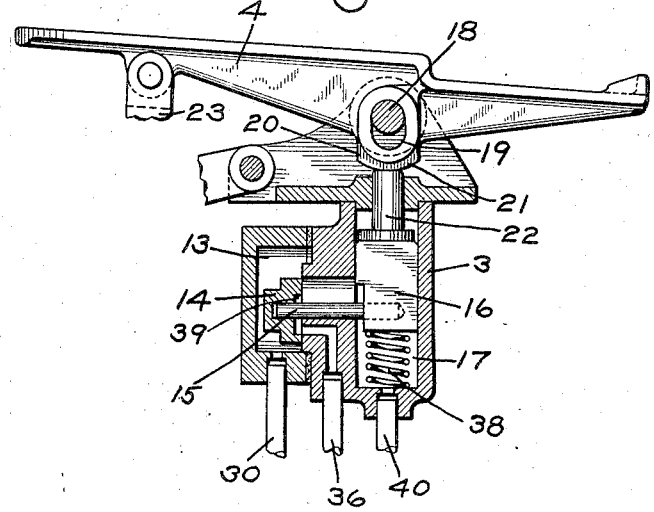

In the accompanying drawing; Fig. 1 is a view of a motor vehicle brake equipment embodying my invention; Fig. 2 a central sectional view of the emergency brake valve mechanism; and Fig. 3 a central sectional view of the service brake valve mechanism.

As shown in the drawing, the equipment may comprise a diaphragm brake cell 1, a service brake valve mechanism 2, an emergency brake valve mechanism 3, and a pedal 4 for controlling the operation of said brake valve mechanisms.

The service brake valve mechanism 2 may comprise a casing, containing a flexible diaphragm 5, an exhaust valve 6, and an application valve 7. A member 8 engages the stems of the valves 6 and 7 and is adapted to be operated by the movement of the diaphragm 5 for controlling the valves 6 and 7.

A spring 9 acts on the opposite side of the diaphragm 5 and engages a spring pin 10 which in turn engages a pivoted arm 11 having an operating lever 12.

The emergency brake valve mechanism 3 may comprise a casing having a valve chamber 13, containing a slide valve 14. A pin 15 extends into a bore in the valve 14 and is secured to a movable member 16 mounted in a chamber 17, adjacent to the valve chamber 13, so that the valve is operated by the movement of the member 16.

The foot pedal 4 is pivotally mounted on a pin 18, the pedal having an elongated slot 19 in which said pin works. Said pedal is provided below the slot 19 with a portion 20 having an arcuate face 21 adapted to engage the upper end of a pin 22, which in turn engages the movable member 16.

Connected to the pedal 4 through a link 23 is a rod 24, having the lower end pivotally connected to one end of a rocker arm 25 and connected to the other end of the arm 25 is a rod 26, which is pivotally connected to the lever 12, the rocker arm 25 being fulcrumed on a bracket 27 fixed to the car body.

The outer end of the pedal 4 is adapted to engage an engine accelerator button 28, so that when the pedal is depressed, the button will be operated to supply fuel to the engine in the usual manner.

A reservoir 29, containing fluid under pressure, is connected by pipe 30 to valve chamber 13 and by pipe 31 to valve chamber 32 of the service brake valve mechanism. Pipe 33, leading to the brake cell 1, is connected to a casing 34, containing a double check valve 35, said check valve controlling communication from pipes 36 and 37 to the pipe 33.

A coil spring 38 is positioned in chamber 17 of the emergency brake valve mechanism and acts on the member 16 in a direction tending to shift said member and the valve 14 upwardly.

In operation, when the operator applies his foot to the pedal 4 and moves the same downwardly, the lost motion in the slot 19 will be taken up and the pedal will be moved so that the pin 18 engages the upper end wall of the slot. In this movement, the arcuate face 21 acts on the pin 22, depressing the same against the resistance of the spring 38, and causing a downward movement of the member 16 and the valve 14 to the position shown in Fig. 2. In this position, the valve 14, through a cavity 39, connects chamber 17 with pipe 36, and since chamber 17 is connected to an atmospheric exhaust pipe 40, the pipe 36 will now be connected to the atmosphere.

In this position, as also shown in Fig. 1, the pedal 4 engages or is just about to engage the button 28, so that further downward movement of the pedal will operate to depress the button and thereby regulate the supply of fuel to the engine of the vehicle.

Figure 3:
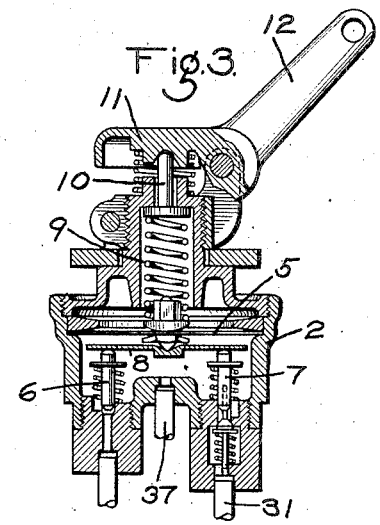

In the above position, the parts are so disposed, that the arm 12 of the service brake valve mechanism will be in the position shown in Fig. 3, in which the arm 11 does not exert pressure on the pin 10, and consequently, the diaphragm 5 permits the exhaust valve 6 to assume its open position, while the application valve 7 is held seated. Movement of the pedal 4 to depress the button 28, merely causes a further movement of the lever 12 in a clockwise direction, which does not have any effect on the pin 10. If the operator desires to apply the brakes, he rotates the pedal 4 in a clockwise direction from the position shown in Fig. 2. In this movement, the pedal rocks or turns on the pin 18 and the arcuate face 21 remaining in engagement with the pin 22, no change in the position of the valve 14 takes place.

The above movement of the pedal 4, however, causes a counter clockwise movement of the lever 12 through the movement of the rods 24 and 26 and the rocker arm 25 and thereby the arm 11 is depressed, so that spring 9 is compressed to exert pressure on the diaphragm 5. The diaphragm 5 is thus moved so as to close the exhaust valve 6 and then open the application valve 7. Fluid under pressure is then supplied from the reservoir 29, through pipe 31, past the valve 7 to pipe 37 and thence past the double check valve 35 to the brake cell 1, so as to cause an application of the brakes.

The brakes may be released by moving the pedal 4 back to the release position, as shown in Fig. 1 and the diaphragm 5 being relieved of the pressure of the spring 9, the valve 7 will move to its seat and the exhaust valve 6 will be unseated, to permit the exhaust of fluid from the brake cell 1.

If the operator should remove his foot from the pedal 4, as in case he becomes incapacitated, then the spring 38 will operate to shift the member 16 upwardly, causing the valve 14 to be moved so as to cut off the exhaust chamber 17 from the pipe 36 and at the same time uncover the port opening of said pipe to the valve chamber 13. Fluid under pressure will then be supplied from the reservoir 29 through pipe 30, valve chamber 13, and pipe 36, to the double check valve 35, which is then shifted to the right, so as to open communication from the pipe 36 to the pipe 33 and the brake cell 1. An emergency application is thus effected and the car brought to a stop in case the operator becomes incapacitated.

Having now described my invention, what I claim as new and desire to secure by Letters Patent, is:—

1. In a motor vehicle brake, the combination with a valve mechanism for controlling the brakes in service and a valve mechanism for controlling the brakes in an emergency, of manually controlled means for controlling the operation of said valve mechanisms.

2. In a motor vehicle brake, the combination with a valve mechanism for controlling the brakes in service and a valve mechanism for controlling the brakes in an emergency, of a foot pedal controlled means for controlling the operation of said valve mechanisms.

3. In a motor vehicle brake, the combination with a valve mechanism for controlling the brakes in service and a valve mechanism for controlling the brakes in an emergency, of manually controlled means operable to control said service valve mechanism and means for effecting the operation of said emergency valve mechanism when said manually controlled means is released.

4. In a motor vehicle brake, the combination with a foot pedal, of a valve mechanism operated by said foot pedal for controlling the brake and a valve mechanism operated when the operator removes his foot from the pedal for effecting an emergency application of the brakes.

5. In a motor vehicle brake, the combination with a service valve mechanism for controlling the brakes, of a pedal for operating said valve mechanism and a valve mechanism operated upon release of the pedal for effecting an emergency application of the brakes, said emergency valve mechanism being rendered inactive upon a movement of said pedal relative to said service valve mechanism.

6. In a motor vehicle brake, the combination with a valve mechanism biased to a position for effecting an emergency application of the brakes, of a pedal, a fulcrum pin working in an elongated slot in said pedal, and means operated by a movement of said pedal relative to said pin for rendering said valve mechanism inactive.

7. In a motor vehicle brake, the combination with a valve mechanism biased to a position for effecting an emergency application of the brakes, of a valve mechanism for controlling the brakes in service, a pedal for operating said service valve mechanism and said emergency valve mechanism, and a fulcrum pin working in an elongated slot in said pedal, whereby said service valve mechanism is operated by rocking the pedal on said fulcrum pin and said emergency valve mechanism is operated when the operator removes his foot from the pedal.

In testimony whereof I have hereunto set my hand.

HENRY D. HUKILL.